United States Patent
Haster

(10) Patent No.: US 8,995,428 B2
(45) Date of Patent: Mar. 31, 2015

(54) SIGNALLING MESSAGES IN A COMMUNICATIONS NETWORK NODE TO COMMUNICATE A CALLED ADDRESS STRING

(75) Inventor: Lars-Olof Haster, Huddinge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 76 days.

(21) Appl. No.: 13/144,864

(22) PCT Filed: Jan. 16, 2009

(86) PCT No.: PCT/EP2009/000247
§ 371 (c)(1),
(2), (4) Date: Aug. 16, 2011

(87) PCT Pub. No.: WO2010/081490
PCT Pub. Date: Jul. 22, 2010

(65) Prior Publication Data
US 2011/0292929 A1    Dec. 1, 2011

(51) Int. Cl.
*H04L 12/66* (2006.01)
*H04M 7/00* (2006.01)
*H04L 29/08* (2006.01)

(52) U.S. Cl.
CPC ........ *H04M 7/0093* (2013.01); *H04M 2201/18* (2013.01); *H04M 2201/36* (2013.01); *H04L 67/2842* (2013.01)
USPC ............ 370/352; 370/338; 370/236; 370/230

(58) Field of Classification Search
USPC ...................................... 370/352
See application file for complete search history.

(56) References Cited

U.S. PATENT DOCUMENTS

| | | | | |
|---|---|---|---|---|
| 6,061,432 A * | 5/2000 | Wallace et al. | ............ | 379/88.18 |
| 7,212,622 B2 * | 5/2007 | Delaney et al. | .......... | 379/221.02 |
| 7,280,530 B2 * | 10/2007 | Chang et al. | .................. | 370/352 |
| 7,352,856 B2 * | 4/2008 | Matsuhashi et al. | ..... | 379/387.02 |
| 7,542,455 B2 * | 6/2009 | Grayson et al. | ............ | 370/338 |
| 7,606,219 B2 * | 10/2009 | Wheeler et al. | ............... | 370/352 |
| 7,642,934 B2 * | 1/2010 | Scott | ............................... | 341/23 |
| 7,647,374 B2 * | 1/2010 | Rajahalme et al. | .......... | 709/204 |
| 8,072,967 B2 * | 12/2011 | Rosenberg et al. | .......... | 370/352 |
| 8,254,551 B2 * | 8/2012 | Heinze et al. | ............ | 379/220.01 |

(Continued)

FOREIGN PATENT DOCUMENTS

JP        7-170334 A        7/1995

OTHER PUBLICATIONS

International Search Report mailed on Sep. 16, 2009 in international application No. PCT/EP2009/000247.

(Continued)

*Primary Examiner* — Ian N Moore
*Assistant Examiner* — Lakeram Jangbahadur
(74) *Attorney, Agent, or Firm* — Patent Portfolio Builders PLLC

(57) ABSTRACT

Communications network node (5) configured to receive a called address string of a call destination and to output the called address string. The node comprises a processor (10) and a memory (12). The memory arranged to store at least one address string, and the processor configured to compare the called address string with the at least one stored address string. If the received called address string corresponds to one of the at least one stored address string the processor configured to cause the called address string to be output as a single signalling message.

11 Claims, 5 Drawing Sheets

(56) References Cited

U.S. PATENT DOCUMENTS

| | | | |
|---|---|---|---|
| 2001/0028642 A1* | 10/2001 | Veschi | 370/352 |
| 2002/0045458 A1* | 4/2002 | Parantainen et al. | 455/466 |
| 2002/0115475 A1* | 8/2002 | Abrol et al. | 455/564 |
| 2004/0095894 A1* | 5/2004 | Eloranta et al. | 370/252 |
| 2005/0195802 A1* | 9/2005 | Klein et al. | 370/352 |
| 2006/0179114 A1* | 8/2006 | Deeds | 709/206 |
| 2006/0221941 A1* | 10/2006 | Kishinsky et al. | 370/352 |
| 2006/0251054 A1* | 11/2006 | Peters et al. | 370/352 |
| 2007/0086440 A1* | 4/2007 | Xiao | 370/352 |
| 2007/0110043 A1* | 5/2007 | Girard | 370/352 |
| 2007/0242672 A1 | 10/2007 | Grayson et al. | |
| 2008/0144798 A1* | 6/2008 | Sidhom et al. | 379/211.02 |
| 2008/0181382 A1* | 7/2008 | Lean et al. | 379/201.12 |
| 2009/0252157 A1* | 10/2009 | Van Elburg et al. | 370/352 |
| 2010/0135280 A1* | 6/2010 | Ikegami et al. | 370/352 |
| 2010/0149973 A1* | 6/2010 | Krupp et al. | 370/230 |
| 2010/0150328 A1* | 6/2010 | Perreault et al. | 379/142.04 |
| 2010/0195811 A1* | 8/2010 | Beckemeyer | 379/201.12 |
| 2010/0220714 A1* | 9/2010 | Clark et al. | 370/352 |
| 2012/0063586 A1* | 3/2012 | Lundsgaard et al. | 379/230 |

OTHER PUBLICATIONS

Written Opinion of the International Searching Authority mailed on Sep. 16, 2009 in international application No. PCT/EP2009/000247.
International Preliminary Report on Patentability mailed on Jan. 10, 2011 in international application No. PCT/EP2009/000247.
International Telecommunication Union, "Implementors' Guide for Recommendation H.248.1 Version 2 (Media Gateway Control Protocol) and its Corrigendum 1 (Mar. 2004)," Telecommunication Standardization Sector of ITU, May 2, 2008.

* cited by examiner

SIGNALLING MESSAGES IN A COMMUNICATIONS NETWORK NODE TO COMMUNICATE A CALLED ADDRESS STRING

TECHNICAL FIELD

The present invention relates generally to communications networks.

BACKGROUND

During establishment of a call connection from a caller communications device to a call recipient communications device signalling messages to communicate a called address string are sent from the media access gateway to a call agent or server. This signalling, however, can result in delays to establishing the call connection. We have realised that it would be advantageous to improve call connection establishment.

SUMMARY

According to one aspect of the invention there is provided a communications network node configured to receive a called address string of a call destination and to output the called address string. The node comprises a processor and a memory, the memory arranged to store at least one address string, and the processor configured to compare the called address string with the at least one stored address string. If the received called address string corresponds to one of the at least one stored address strings the processor configured to cause the called address string to be output as a single signalling message.

In one embodiment of the invention the communications node comprises an access gateway, and advantageously the gateway is configured to send a called address string to a call agent as a single signalling message, so reducing the time required for successful call connection.

Preferably the communications network node is configured to output the called address string in multiple signalling messages if the called address string does not correspond to one of the at least one of the stored address strings. Each signalling message comprises a subset of digits of the called address string.

The signalling messages are preferably signalling messages in accordance with DigitMap H.248 signalling or Session Initiation Protocol, SIP.

The memory is preferably arranged to store at least one previously called address string received by the node during a call establishment process.

The processor is preferably configured to store the called address string in the memory as a previously dialled address string if the processor determines that the called address string does not correspond to any of the stored address strings and the processor determines that a connection to a recipient communications device has been achieved using the address string.

The processor is preferably configured to determine that a called address string should be stored in the memory on receipt of a signal indicative that a connection has been achieved to the recipient communications device.

The memory is preferably arranged to store caller-specific address strings.

The processor is preferably arranged to associate in the memory a caller address string with address strings called by that caller.

The memory is preferably arranged to store a predetermined maximum number of validated address strings for each caller.

The memory may be arranged to store at least one address string available for use by the processor in respect of called address strings received from any of a plurality of caller address strings.

The communications node is preferably arranged to at least in part enable call establishment between a caller communications device and a call recipient communications device.

The communications node may conveniently comprise a gateway equipment.

According to another aspect of the invention there is provided a method for use in establishing a call connection between communications devices. The method comprises receiving a called address string of a call destination, comparing the received called address string with at least one stored called address string, and if the received called address string corresponds to one of the least one stored address string then outputting the called address string as a single signalling message.

The received called address string comprises a plurality of digits and the method preferably comprises receiving the digits one at a time.

Another aspect of the invention relates to machine-readable instructions for a processor of a communications network node, the instructions configured, when loaded onto the processor, to cause the processor to compare a received called address string to at least one stored previously called address string. If the received called address string corresponds to the at least one stored called address string the processor causes the node to output the called address string as a single signalling message.

BRIEF DESCRIPTION OF THE DRAWINGS

Various embodiments of the invention will now be described, by way of example only, with reference to the accompanying drawings in which.

DETAILED DESCRIPTION

Figure 1:
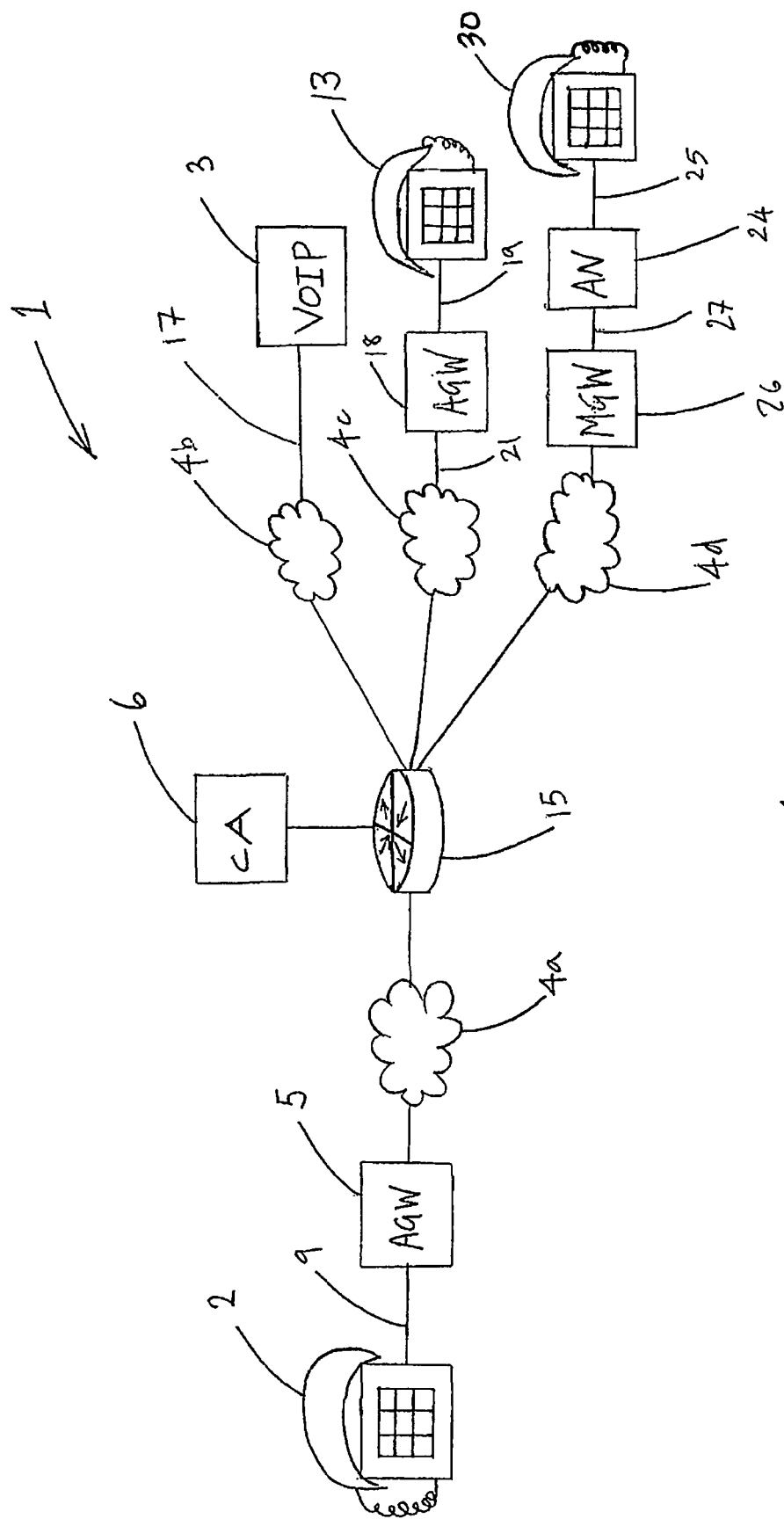
FIG. 1 shows a communications network.

With reference to FIG. 1 there is shown a telecommunications network 1 comprising a caller communications device 2 and recipient or called communications devices or terminals 3, 13 and 30, network infrastructures 4*a*, 4*b*, 4*c* and 4*d*, a media access gateway (AGW) node 5, a call agent (CA) node 6 and a router 15. During a call setup procedure in which a connection is established between two of the communications devices, suitable signalling between AGW 5 and CA 6 is performed so that the CA 6 can establish a through-connection to the communications device 3 via the router 15. In broad terms, the functionality of the AGW 5 includes receiving a called address string, or number, comprising a plurality of digits, from the caller communications device 2 and forwarding this address string to the CA 6. The CA 6 then analyses the received address string, causes ringing to be commenced at one of the recipient communications devices 3, 13 or 30 and then establishes a through-connection between the communications devices when the recipient answers.

The caller communications device 2 comprises a telephone of the type which uses Dual Tone Multi Frequency (DTMF) dialling or pulsed dialling (by way of a dial component). The router 15 communicates with the communications devices 3, 13 and 30 by way of the network infrastructures 4b, 4c and 4d. The communications device 2 is connected to the AGW 5 via a subscriber line 9, and the AGW 5 is connected to the (Internet Protocol-enabled) network infrastructure 4a. The communications device 3 is a Voice over Internet Protocol (VoIP) enabled device which connects with the network infrastructure 4b by way of Session Initiation Protocol (SIP) over communications link 17. The communications device 13 is connected to a media access gateway (AGW) 18 by subscriber line 19. The AGW 18 communicates with the network infrastructure 4c on link 21 by way of Real-time Transport (RTP) and by way of DigitMap H.248 signalling. The communications device 30 communicates with an Access Network (AN) 24 via a subscriber line 25, and the AN 24 communicates with a Media Gateway 26 over link 27 via Time Division Multiplexing (TDM).

Figure 2:
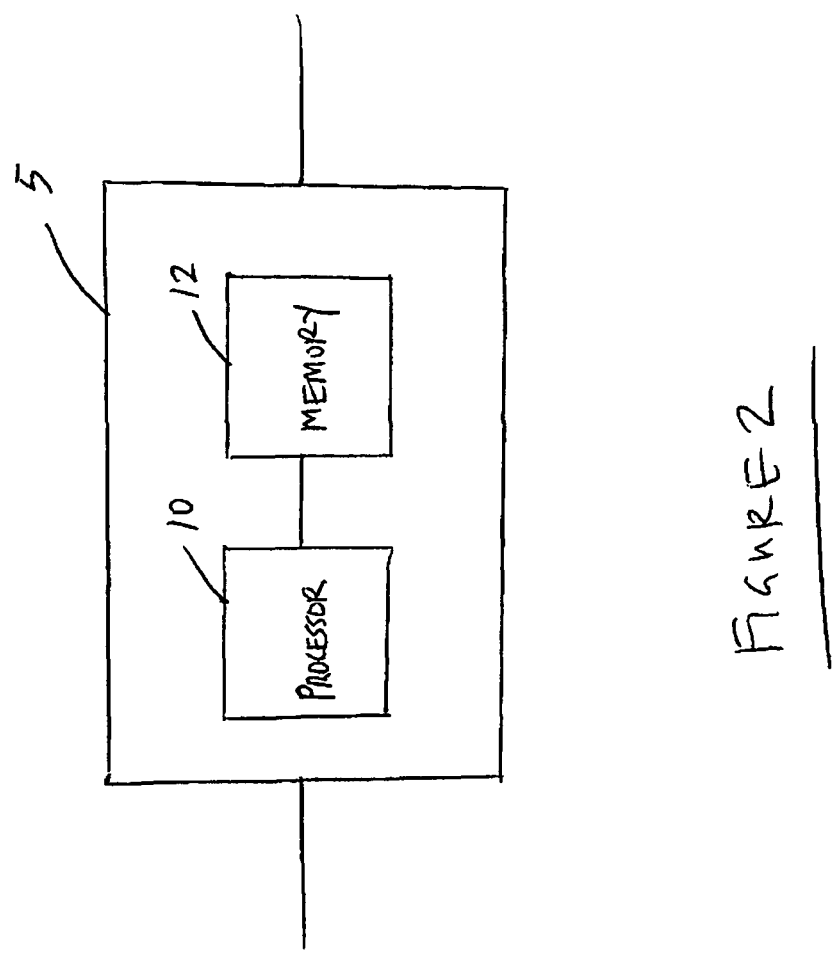
FIG. 2 shows a communications network node.

As shown in FIG. 2, the AGW 5 comprises a processor 10 and a memory 12. The operation of the processor 10 is determined by suitable machine-readable instructions, which may be stored in the memory 12. As will be described below, the processor 10 causes validated called address strings received from the user communications device 2 to be stored in the memory 12. In particular, the processor 10 is operative to cause called address strings to be stored in association with the address string of the caller communications device 2.

Figure 3:
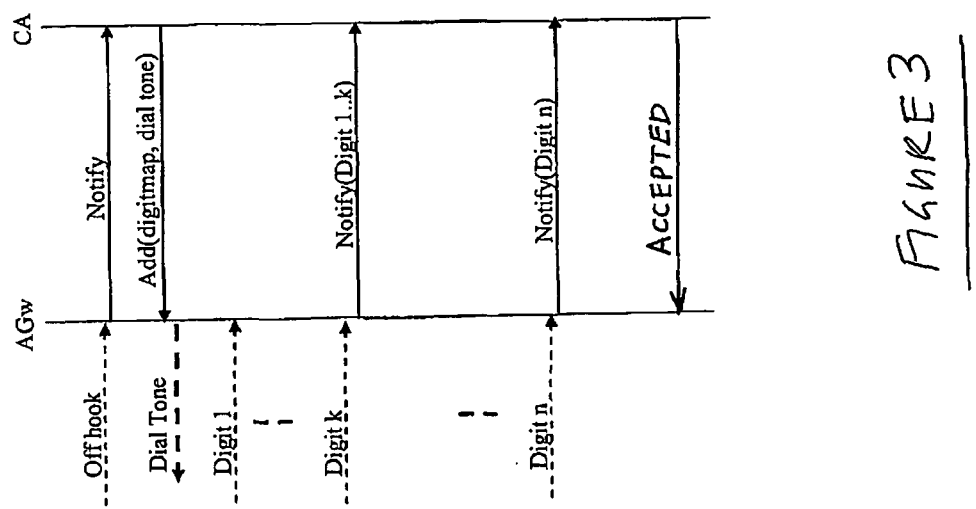
FIG. 3 shows a message signalling diagram.
Figure 5:
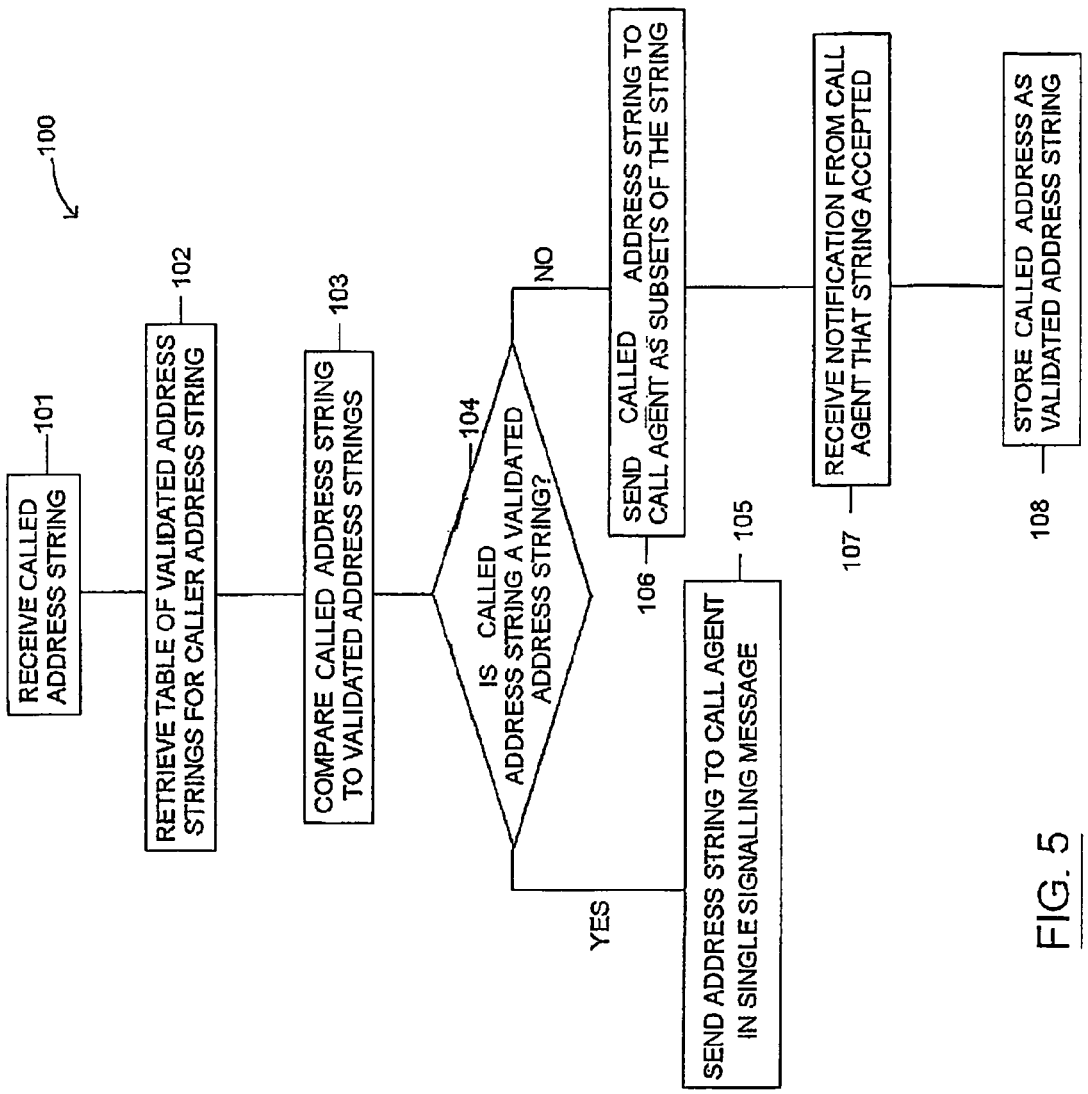
FIG. 5 shows a flow diagram.

Initially, the memory 10 contains no entries of validated dialled address strings, and a learning process then commences to learn validated address strings called by the communications device 2. This procedure is shown in FIGS. 3 and 5. When the communications device 2 commences making a call to one of the recipient communications devices 3, 13 or 30, the address string of the recipient communications device and the address string of the communications device 2 are sent across the network infrastructure 4a to the AGW 5. When the communications device 2 goes 'off-hook', this is detected by the AGW 5, and the AGW 5 notifies the CA 6 accordingly. The CA 6 then causes a dialling tone to be added to the communications device 2. The AGW 5 then receives the digits of the called address string and those of the address string of the caller communications device 2, one digit at a time. The processor 10 then retrieves a table from the memory 12 relating to validated called strings originating from the communications device 2. At this initial stage, no validated numbers are stored in the table and so the processor 10 determines that the called string is to be sent to the CA 6 using DigitMap H.248 signalling. This involves sending multiple signalling messages, each message comprising a subset of the string of n digits, the subset comprising a predetermined number of digits k, as shown in FIG. 3. Once the CA 6 has received all of the digits, the CA 6 then analyses and processes the address string so that the connection can be made to the recipient communications device. The CA 6 is then able to confirm, or otherwise, that the address string is a valid address string by detecting when ringing commences of the recipient communications device, and an acceptance signalling message containing confirmation that the address string is valid (i.e. it is complete and is not a faulty number) is then sent to the AGW 5. Therefore, CA 6 outputs the acceptance signalling message if it achieves a connection to the recipient communications device 3. On receipt of such acceptance/validation signalling message, the processor 10 is then operative to cause the called address string to be stored in the memory 12 as a validated address string, associated with the address string of the caller communications device 2.

Figure 4:
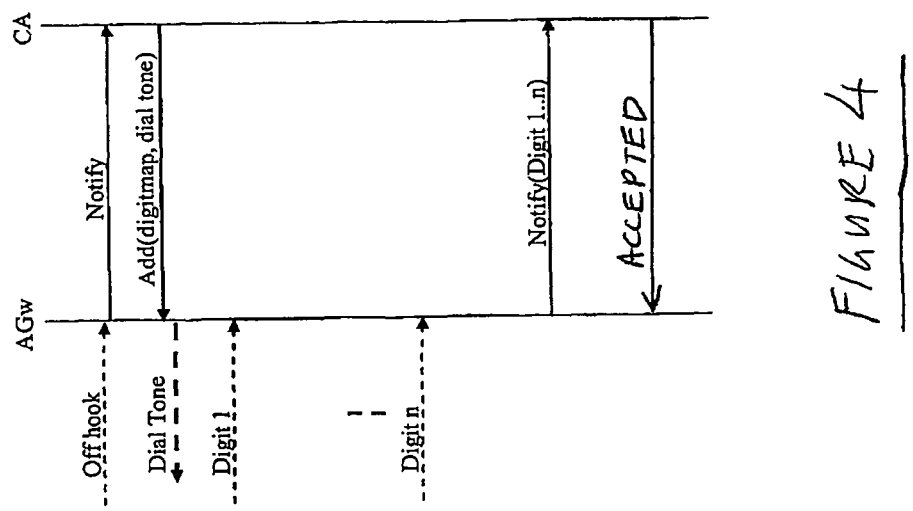
FIG. 4 shows a message signalling diagram.

Turning now to FIG. 4, there is shown the sequence of signalling, which takes place subsequent to the signalling in FIG. 3, in which the caller communications device 2 wishes to make a call to the communications device called previously. On receipt of the called address string, the processor 10 compares the called address string to the validated address strings stored in the memory 12 associated with the address string of the user communications device 2. The processor 10 determines that the called address string matches an address string stored in the memory 12. The processor 10 then causes the called address string stored in the memory 12 to be sent to the CA 6 as a single signalling message, namely all digits 1 to n of the address string are sent to the CA 6.

Advantageously, in the case of multiple users, the memory 12 stores a table of validated address strings for each user (or rather for each originating address string). By arranging that each user has his own table (or put another way that the memory stores caller-specific tables) the processing required by the processor 10 in determining whether a match exists is considerably reduced as compared to if the processor needed to review all of the validated address strings stored in the memory 12. The AGW 5 could be arranged such that each user is allocated a predetermined maximum number of validated address strings which can be stored in the memory 12. When the processor 10 encounters an address string which is not present in the memory 12, but which has been accepted by the CA 6, and the predetermined number of stored address strings for that caller has been reached, the processor 10 will cause one of the stored validated address strings (which could for example be the least used or oldest address string) to be replaced by the 'new' dialed address string.

FIG. 5 shows a flow diagram 100 of the various steps performed by the processor 10. At step 101 the processor receives a called address string. The processor 10 then retrieves the respective table of validated address strings for that caller and compares the called address string to those stored address strings, as shown at steps 102 and 103. At step 104 the processor 10 determines if the called address string is a validated (previously) called address string. If it is, then the address string is sent to the CA 6 as a single signalling message, as shown at step 105. Otherwise, the processor 10 sends the address string as multiple signalling messages (at step 106). If the processor then receives confirmation (at step 107) from the CA 6 that a through connection has been achieved with the address string then the processor stores the address string as a validated address string, as shown at step 108.

It will be appreciated that although in the above described embodiment the memory 10 is initially empty, and is populated subsequently by the learning process described above, in another embodiment the memory 10 may be pre-loaded with one or more address strings, which are immediately available to the processor 10 for use in comparing against a called address string, prior to any further address strings being added as a result of the learning process.

It will also be appreciated that certain address strings are likely to be needed by multiple callers, such as the address strings for emergency services, transportation services and social/community services. Such numbers may advantageously be stored in the memory 12 as a table of shared address strings, which table may be created by the network administrator or service provider. The processor 10 can then compare a dialled address string to both the address strings in the caller-specific table as well as in the shared table.

The AGW 5 is advantageously able to send received digits of a called address string and send the digits as fast as possible to the CA 6 using fewer signalling messages. This is particularly advantageous in the case mentioned above in which the called address string is sent to the AGW 5 by the communications device 2 one digit at a time. Another important advantage of the above embodiment is that no changes are required to the existing H.248 DigitMap signalling procedure. Therefore use of the DigitMap signalling can be continued and act as the default in the instance that a called address string is not stored in the memory 12.

It will be appreciated that although particular mention above has been made H.248 signalling in relation to an access gateway, other embodiments of the invention may include a gateway equipment which converts Time Division Multiplexed (TDM) signals and H.248 or SIP signals.

The invention claimed is:

1. A communications network node configured to receive a called address string of a call destination and to output the called address string, the node comprising:
   a processor; and
   a memory, the memory arranged to store at least one address string and to store at least one previously called address string received by the node during a call establishment process,
   wherein the processor is configured
      to compare the called address string with the at least one stored address string,
      if the called address string corresponds to one of the at least one stored address string, to cause the called address string comprising plural digits to be output as a single signalling message,
      if the called address string does not correspond to one of the at least one of the stored address strings, to output the called address string in multiple signalling messages, each signalling message comprising a subset of the digits of the called address string in which the multiple signalling messages are signalling messages in accordance with DigitMap H.248 signalling or Session Initiation Protocol, SIP, and
      to store the called address string in the memory as a previously dialed address string if the processor determines that the called address string does not correspond to any of the stored address strings and the processor determines that a connection to a recipient communications device has been achieved using the called address string.

2. The communications network node as in claim 1, the processor configured to determine that the called address string is to be stored in the memory on receipt of a signal indicative that a connection has been achieved to the recipient communications device.

3. The communications network node as in claim 1 the memory arranged to store caller-specific address strings.

4. The communications network node as in claim 3, the processor arranged to associate in the memory a caller address string with address strings called by that caller.

5. The communications network node as in claim 3 the memory arranged to store a predetermined maximum number of validated address strings for each caller.

6. The communications network node as in claim 1 the memory arranged to store at least one address string available for use by the processor in respect of called address strings received from any of a plurality of caller address strings.

7. The communications network node as in claim 1 arranged to at least in part enable call establishment between a caller communications device and a call recipient communications device.

8. The communications network node as in claim 1 wherein the communications network node comprises a gateway equipment.

9. A method for use in establishing a call connection between communications devices, the method comprising:
   receiving digits that form a called address string of a call destination;
   comparing the received called address string with at least one stored called address string and storing at least one previously called address string received during a call establishment process;
   if the received called address string corresponds to one of the at least one stored address string, outputting the called address string as a single signalling message;
   if the called address string does not correspond to one of the at least one of the stored address strings, to output the called address string in multiple signalling messages, each signalling message comprising a subset of the digits of the called address string in which the multiple signalling messages are signalling messages in accordance with DigitMap H.248 signalling or Session Initiation Protocol, SIP; and
   storing the called address string as a previously dialed address string if determined that the called address string does not correspond to any of the stored address strings and the processor determines that a connection to a recipient communications device has been achieved using the called address string.

10. The method as in claim 9 in which the digits of the received called address string are received one at a time.

11. A non-transitory machine-readable storage storing instructions which, when executed by a processor of a communication network node, perform a method comprising:
   comparing a received called address string to at least one previously called address string and storing at least one previously called address string received during a call establishment process;
   if the received called address string corresponds to the at least one stored called address string, outputting the called address string comprising plural digits as a single signalling message;
   if the called address string does not correspond to one of the at least one of the stored address strings, to output the called address string in multiple signalling messages, each signalling message comprising a subset of the digits of the called address string in which the multiple signalling messages are signalling messages in accordance with DigitMap H.248 signalling or Session Initiation Protocol, SIP; and
   storing the called address string as a previously dialed address string if determined that the called address string does not correspond to any of the stored address strings and the processor determines that a connection to a recipient communications device has been achieved using the called address string.

* * * * *